(12) United States Patent
Bae et al.

(10) Patent No.: US 12,424,658 B2
(45) Date of Patent: Sep. 23, 2025

(54) ELECTROLYTE FOR LITHIUM SECONDARY BATTERY AND LITHIUM SECONDARY BATTERY COMPRISING SAME

(71) Applicant: SAMSUNG SDI CO., LTD., Yongin-si (KR)

(72) Inventors: Tae Hyon Bae, Yongin-si (KR); Seungyeop Oh, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 735 days.

(21) Appl. No.: 17/772,020

(22) PCT Filed: Nov. 16, 2020

(86) PCT No.: PCT/KR2020/016081
§ 371 (c)(1),
(2) Date: Apr. 26, 2022

(87) PCT Pub. No.: WO2021/118085
PCT Pub. Date: Jun. 17, 2021

(65) Prior Publication Data
US 2022/0367913 A1    Nov. 17, 2022

(30) Foreign Application Priority Data
Dec. 12, 2019    (KR) .................... 10-2019-0165820

(51) Int. Cl.
*H01M 10/0567*    (2010.01)
*H01M 4/485*    (2010.01)
(Continued)

(52) U.S. Cl.
CPC ....... *H01M 10/0567* (2013.01); *H01M 4/485* (2013.01); *H01M 4/505* (2013.01);
(Continued)

(58) Field of Classification Search
CPC ......... H01M 10/0567; H01M 10/0525; H01M 10/0568; H01M 10/0569;
(Continued)

(56) References Cited

U.S. PATENT DOCUMENTS

| 2011/0183213 A1 | 7/2011 | Inoue et al. |
| 2011/0183218 A1* | 7/2011 | Odani ............... H01M 10/4235 |
| | | 429/342 |

(Continued)

FOREIGN PATENT DOCUMENTS

| CN | 107275553 A * 10/2017 ........ H01M 10/0525 |
| JP | 2015-125934 A 7/2015 |

(Continued)

OTHER PUBLICATIONS

Gi ("Tris(pentafluorophenyl) borane as an electrolyte additive for high performance silicon thin film electrodes in lithium ion batteries", Electrochimica Acta, 56 (2011) 8997-9003 (Year: 2011).*

(Continued)

*Primary Examiner* — Matthew J Merkling
(74) *Attorney, Agent, or Firm* — Lee IP Law, P.C.

(57) ABSTRACT

Provided is an electrolyte for a lithium secondary battery that comprises a non-aqueous organic solvent, a lithium salt, and an additive, wherein the additive includes a mixture of a compound represented by Chemical Formula 1, a compound represented by Chemical Formula 2, and a cyclic carbonate-based compound substituted with a halogen.

The details of Chemical Formula 1 and Chemical Formula 2 are as described in the specification.

15 Claims, 4 Drawing Sheets

(51) Int. Cl.
*H01M 4/505* (2010.01)
*H01M 4/525* (2010.01)
*H01M 10/0525* (2010.01)
*H01M 10/0568* (2010.01)
*H01M 10/0569* (2010.01)

(52) U.S. Cl.
CPC ....... *H01M 4/525* (2013.01); *H01M 10/0525* (2013.01); *H01M 10/0568* (2013.01); *H01M 10/0569* (2013.01); *H01M 2300/0037* (2013.01)

(58) Field of Classification Search
CPC ......... H01M 2300/0037; H01M 4/485; H01M 4/505; H01M 4/525
See application file for complete search history.

(56) References Cited

U.S. PATENT DOCUMENTS

| | | | |
|---|---|---|---|
| 2012/0141883 A1* | 6/2012 | Smart | H01M 6/164 429/330 |
| 2014/0248543 A1 | 9/2014 | Zhu et al. | |
| 2015/0037690 A1 | 2/2015 | Dalavi et al. | |
| 2016/0211548 A1 | 7/2016 | Jin et al. | |
| 2017/0033359 A1 | 2/2017 | Ogumi et al. | |
| 2017/0033404 A1 | 2/2017 | Strand et al. | |
| 2019/0363339 A1* | 11/2019 | Zhu | H01M 4/387 |
| 2020/0044278 A1 | 2/2020 | Zhang et al. | |
| 2022/0115740 A1* | 4/2022 | Adams | H01M 50/491 |

FOREIGN PATENT DOCUMENTS

| | | |
|---|---|---|
| KR | 10-2011-0086513 A | 7/2011 |
| KR | 10-2011-0094578 A | 8/2011 |
| KR | 10-2014-0099864 A | 8/2014 |
| KR | 10-2017-0028874 A | 3/2017 |
| KR | 10-2019-0122873 A | 10/2019 |

OTHER PUBLICATIONS

Machine Translation of CN-107275553-A (Jan. 28, 2025) (Year: 2025).*

Choi, Nam-Soon, et al., "Scavenging Materials to Stabilize LiPF6-Containing Carbonate-Based Electrolytes for Li-Ion Batteries", Advanced Materials, 2019, vol. 31, No. 20, 1804822(1-12).

International Search Report dated Feb. 22, 2021 for PCT/KR2020/016081.

* cited by examiner

ELECTROLYTE FOR LITHIUM SECONDARY BATTERY AND LITHIUM SECONDARY BATTERY COMPRISING SAME

CROSS REFERENCE TO RELATED APPLICATIONS

This is the U.S. national phase application based on PCT Application No. PCT/KR2020/016081, filed Nov. 16, 2020, which is based on Korean Patent Application No. 10-2019-0165820, filed Dec. 12, 2019, the entire contents of all of which are hereby incorporated by reference.

TECHNICAL FIELD

An electrolyte for a secondary lithium battery and a secondary lithium battery including the same are disclosed.

BACKGROUND ART

A lithium secondary battery may be recharged and has three or more times as high energy density per unit weight as a conventional lead storage battery, nickel-cadmium battery, nickel hydrogen battery, nickel zinc battery, and the like and may be also charged at a high rate and thus, is commercially manufactured for a laptop, a cell phone, an electric tool, an electric bike, and the like, and researches on improvement of additional energy density have been actively made.

In particular, as IT devices increasingly become high-performance, high-capacity batteries are required, and accordingly, a voltage region may be expanded to realize high capacity and thus increase energy density, but in a high voltage region, there is a problem that an electrolyte may be oxidized and thus deteriorate positive electrode performance.

For example, $LiPF_6$ that is most commonly used as a lithium salt of an electrolyte has a problem of reacting with an electrolytic solvent to promote depletion of a solvent and generate a large amount of gas. As $LiPF_6$ is decomposed, decomposition products such as HF and $PF_5$ are generated, which causes electrolyte depletion in the battery and leads to deterioration of high-temperature performance and poor safety.

The decomposition products of the electrolyte are deposited in the form of a film on the surface of an electrode and thus increase internal resistance of the battery, which in turn deteriorates battery performance and shortens a lifespan. In particular, these side reactions are much accelerated at a high temperature at which a reaction rate is increased, and gas components generated through the side reactions may rapidly increase battery internal pressures and thus have fatal adverse influences on stability of the battery.

The electrolyte oxidation in a high voltage region is much accelerated and thus known to greatly increase resistance of the electrode in the long-term charging and discharging process.

Accordingly, an electrolyte applicable under the conditions of a high voltage and a high temperature is required. In other words, the electrolyte should secure excellent ion conductivity and stability and in particular, high stability that the side reactions do not occur under the condition of a high voltage of 4.45 V or higher and a high temperature and the like.

DISCLOSURE

Technical Problem

An embodiment provides an electrolyte for a lithium secondary battery that is stable even under high voltage and high temperature conditions corresponding to a high-capacity positive electrode by suppressing decomposition of an electrolyte and reducing side reactions due to oxidation of the electrolyte occurring on the surface of the positive electrode at 4.45 V or higher.

Another embodiment provides a lithium secondary battery having improved cycle-life characteristics at high voltage and high temperature by including the electrolyte for a lithium secondary battery.

Technical Solution

An embodiment of the present invention provides an electrolyte for a lithium secondary battery that includes a non-aqueous organic solvent, a lithium salt, and an additive, wherein the additive includes a mixture of a compound represented by Chemical Formula 1, a compound represented by Chemical Formula 2, and a cyclic carbonate-based compound substituted with a halogen.

[Chemical Formula 1]

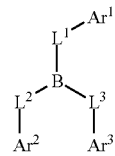

In Chemical Formula 1,
$L^1$ to $L^3$ are each independently a single bond or a substituted or unsubstituted C1 to C5 alkylene, and
$Ar^1$ to $Ar^3$ are each independently a C6 to C20 aryl group substituted with a halogen;

[Chemical Formula 2]

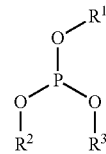

wherein, in Chemical Formula 2,
$R^1$ to $R^3$ are each independently a C1 to C5 alkyl group substituted with a halogen.

$Ar^1$ to $Ar^3$ in Chemical Formula 1 may each independently be a C6 to C20 aryl group substituted with at least two fluoro (—F).

The compound represented by Chemical Formula 1 may be trispentafluorophenyl borane (TPFPB).

$R^1$ to $R^3$ in Chemical Formula 2 may each independently be a C1 to C5 alkyl group substituted with at least two fluoro (—F) groups.

The compound represented by Chemical Formula 2 may be tris(2,2,2-trifluoroethyl)phosphite (TTFP).

The cyclic carbonate-based compound substituted with halogen may be fluoroalkylene carbonate.

The cyclic carbonate-based compound substituted with the halogen may be fluoroethylene carbonate.

The compound represented by Chemical Formula 1 may be included in an amount of 0.5 wt % to 10 wt % based on the total weight of the electrolyte for a lithium secondary battery, the compound represented by Chemical Formula 2 may be included in an amount of 0.5 wt % to 10 wt % based on the total weight of the electrolyte for a lithium secondary battery, and the cyclic carbonate-based compound substituted with the halogen may be included in an amount of 5 wt % to 20 wt % based on the total weight of the electrolyte for a lithium secondary battery.

The compound represented by Chemical Formula 2 may be included in an amount greater than 50 parts by weight and less than or equal to 200 parts by weight based on 100 parts by weight of the compound represented by Chemical Formula 1.

The additive may include a mixture of trispentafluorophenyl borane (TPFPB), tris(2,2,2-trifluoroethyl) phosphite (TTFP), and fluoroethyl carbonate (FEC).

The additive may further include at least one other additive of vinylene carbonate (VC), vinylethylene carbonate (VEC), succinonitrile (SN), polysulfone, 1,3,6-hexane tricyanide (HTCN), propenesultone (PST), propanesultone (PS), lithiumtetrafluoroborate (LiBF$_4$), lithium difluorophosphate (LiPO$_2$F$_2$), and 2-fluorobiphenyl (2-FBP).

The other additive may be included in an amount of 5 wt % to 20 wt % based on the total weight of the electrolyte for a lithium secondary battery.

The non-aqueous organic solvent may include a cyclic carbonate and a chain carbonate in a volume ratio of 1:9 to 1:5.

Another embodiment of the present invention provides a lithium secondary battery including a positive electrode including a positive active material; a negative electrode including an anode active material; and the aforementioned electrolyte.

The positive active material may be at least one type of lithium composite oxide represented by Chemical Formula 4.

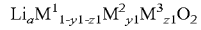  [Chemical Formula 4]

$$Li_aM^1{}_{1-y1-z1}M^2{}_{y1}M^3{}_{z1}O_2$$

In Chemical Formula 4,
0.9≤a≤1.8, 0≤y1≤1, 0≤z1≤1, 0≤y1+z1<1, and M$^1$, M$^2$, and M$^3$ are each independently selected from a metal of Ni, Co, Mn, Al, Sr, Mg, or La, and a combination thereof.

The lithium secondary battery may be used at a high voltage of greater than or equal to 4.45 V based on the positive electrode.

Advantageous Effects

As the electrolyte is not only discolored but also not oxidatively decomposed, although a driving voltage of a lithium secondary battery is increased up to 4.45 V or higher, compared with a reduction potential of lithium based on a positive electrode, high temperature characteristics of the electrolyte are improved, realizing excellent high temperature cycle-life characteristics of the lithium secondary battery, when driven at a high voltage.

DESCRIPTION OF SYMBOLS

Figure 1:
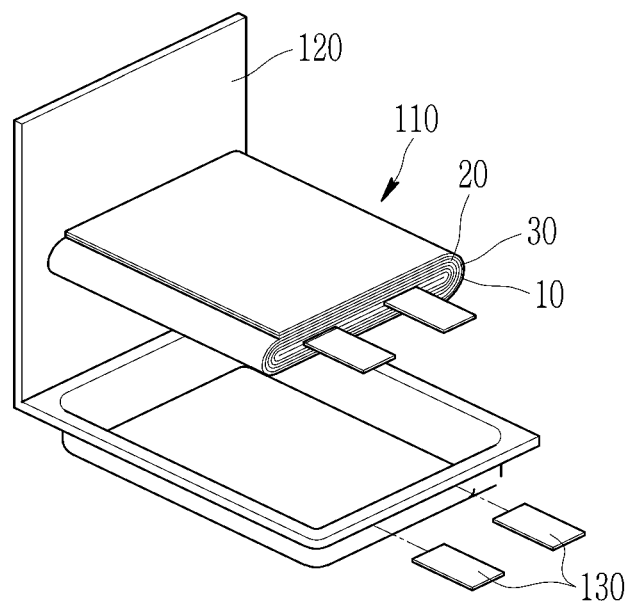
FIG. 1 is a schematic view illustrating a lithium secondary battery according to an embodiment of the present invention.

100: lithium secondary pouch battery
10: positive electrode
20: negative electrode
30: separator
110: electrode assembly
120: case
130: electrode tab

BEST MODE

Hereinafter, embodiments of the present invention are described in detail. However, these embodiments are exemplary, the present invention is not limited thereto and the present invention is defined by the scope of claims.

An electrolyte for a lithium secondary battery according to an embodiment of the present invention includes a non-aqueous organic solvent, a lithium salt, and an additive, wherein the additive includes a mixture of a compound represented by Chemical Formula 1, a compound represented by Chemical Formula 2, and a cyclic carbonate-based compound substituted with a halogen.

The compound represented by Chemical Formula 1 may bind to a PF$_6^-$ anion of LiPF$_6$ in the electrolyte to inhibit the formation of by-products such as HF and PF$_5$.

In addition, the compound represented by Chemical Formula 2 conducts a fluoroanion-stabilizing function together with the compound represented by Chemical Formula 1 and thus may suppress generation of HF as well as act as a scavenger for PF$_5$, suppressing decomposition of the electrolyte.

On the other hand, the compound represented by Chemical Formula 1, when present together with the cyclic carbonate-based compound substituted with the halogen as a cycle-life improving additive in the electrolyte, has a problem of discoloring the electrolyte when driven at a high temperature.

In this regard, the compound represented by Chemical Formula 2 is preferentially combined with the cyclic carbonate-based compound substituted with the halogen to prevent bonding the compound represented by Chemical Formula 1 with the cyclic carbonate-based compound substituted with the halogen and thus suppress a reaction of the compound represented by Chemical Formula 1 and the cyclic carbonate-based compound substituted with the halogen and resultantly, prevent the discoloration of the electrolyte.

Accordingly, the lithium secondary battery including the electrolyte according to an embodiment of the present invention may exhibit improved high-voltage reversible performance and high-temperature cycle-life characteristics.

For example, Ar$^1$ to Ar$^3$ in Chemical Formula 1 may each independently be a C6 to C20 aryl group substituted with at least two fluoro (—F).

As a specific example, Ar$^1$ to Ar$^3$ of Chemical Formula 1 may each independently be a C6 to C20 aryl group in which all hydrogen atoms of the aryl group are substituted with fluoro (—F).

As a more specific example, $Ar^1$ to $Ar^3$ of Chemical Formula 1 may each independently be a pentafluorophenyl group.

For example, the compound represented by Chemical Formula 1 may be tris pentafluorophenyl borane (TPFPB).

For example, $R^1$ to $R^3$ of Chemical Formula 2 may each independently be a C1 to C5 alkyl group substituted with at least two fluoro (—F).

As a specific example, $R^1$ to $R^3$ of Chemical Formula 2 may each independently be a C1 to C5 alkyl group in which all hydrogen atoms of the alkyl group are substituted with fluoro (—F).

In a more specific example, $R^1$ to $R^3$ of Chemical Formula 2 may each independently be a trifluoroethyl group.

For example, the compound represented by Chemical Formula 2 may be tris(2,2,2-trifluoroethyl)phosphite.

For example, the cyclic carbonate-based compound substituted with the halogen may be a fluoroalkylene carbonate.

For example, the cyclic carbonate-based compound substituted with the halogen may be fluoroethylene carbonate.

According to an embodiment, the compound represented by Chemical Formula 1 may be included in an amount of 0.5 to 10 wt % based on the total weight of the electrolyte for a lithium secondary battery, the compound represented by Chemical Formula 2 may be included in an amount of 0.5 to 10 wt % based on the total weight of the electrolyte for a lithium secondary battery, and the cyclic carbonate-based compound substituted with the halogen may be included in an amount of 5 to 20 wt % based on the total weight of the electrolyte for a lithium secondary battery.

When the content of each additive is within the above range, formation of a positive electrode film, formation of a negative electrode film formation, and the decomposition prevention effect of the additive may be maximized.

For example, the compound represented by Chemical Formula 2 may be included in an amount greater than 50 parts by weight and less than or equal to 200 parts by weight based on 100 parts by weight of the compound represented by Chemical Formula 1.

As a specific example, the compound represented by Chemical Formula 2 may be included in an amount of 100 parts by weight to 200 parts by weight based on 100 parts by weight of the compound represented by Chemical Formula 1.

When the content ratio of the compound represented by Chemical Formula 1 and the compound represented by Chemical Formula 2 is the same as above, excellent high-temperature cycle-life characteristics of the lithium secondary battery may be realized without discoloration of the electrolyte.

According to the most specific embodiment of the present invention, the additive may include a mixture of trispentafluorophenyl borane (TPFPB), tris(2,2,2-trifluoroethyl) phosphite (TTFP), and fluoroethyl carbonate (FEC).

Meanwhile, the additive may further include other additives in addition to the aforementioned additives.

The other additives may include at least one type of vinylene carbonate (VC), vinylethylene carbonate (VEC), succinonitrile (SN), polysulfone, 1,3,6-hexane tricyanide (HTCN), propensultone (PST), propanesultone (PS), lithium tetrafluoroborate ($LiBF_4$), lithium difluorophosphate ($LiPO_2F_2$), and 2-fluorobiphenyl (2-FBP).

By further including the aforementioned other additives, the gases generated from the positive electrode and negative electrode may be effectively controlled during high-temperature storage by helping to form a film of the negative electrode as well as the positive electrode.

The other additives may be included in an amount of 5 wt % to 20 wt %, specifically 5 wt % to 15 wt %, for example 5 wt % to 10 wt %, based on the total weight of the electrolyte for a lithium secondary battery.

When the content of other additives is as described above, an increase in film resistance may be minimized, thereby contributing to the improvement of battery performance.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may be methyl acetate, ethyl acetate, n-propyl acetate, t-butyl acetate, methylpropionate, ethylpropionate, propylpropionate, decanolide, mevalonolactone, caprolactone, and the like. The ether-based solvent may be dibutyl ether, tetraglyme, diglyme, dimethoxyethane, 2-methyltetrahydrofuran, tetrahydrofuran, and the like. In addition, the ketone-based solvent may be cyclohexanone, and the like. In addition, the alcohol-based solvent may be ethyl alcohol, isopropyl alcohol, and the like and the aprotic solvent may be nitriles such as R—CN (R is a C2 to C20 linear, branched, or cyclic hydrocarbon group and may include a double bond aromatic ring, or an ether bond), amides such as dimethylformamide, dioxolanes such as 1,3-dioxolane, sulfolanes, and the like.

The non-aqueous organic solvent may be used alone or in a mixture and when the organic solvent is used in a mixture, the mixture ratio may be controlled in accordance with a desirable battery performance.

The carbonate-based solvent is prepared by mixing a cyclic carbonate and a chain carbonate. In this case, when the cyclic carbonate and the chain carbonate are mixed in a volume ratio of 1:1 to 1:9, the performance of the electrolyte may be improved.

In particular, in an embodiment of the present invention, the non-aqueous organic solvent may include the cyclic carbonate and the linear carbonate in a volume ratio of 1:9 to 1:5, and as a specific example, the cyclic carbonate and the linear carbonate may be included in a volume ratio of 1:9 to 1:3.

As a more specific example, the cyclic carbonate and the linear carbonate may be included in a volume ratio of 1:5 to 1:3.

The non-aqueous organic solvent may further include an aromatic hydrocarbon-based organic solvent in the carbonate-based solvent. In this case, the carbonate-based solvent and the aromatic hydrocarbon-based solvent may be mixed in a volume ratio of 1:1 to 30:1.

As the aromatic hydrocarbon-based solvent, an aromatic hydrocarbon-based compound represented by Chemical Formula 3 may be used.

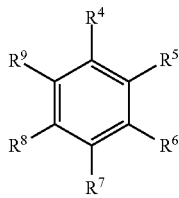

[Chemical Formula 3]

In Chemical Formula 3, $R^4$ to $R^9$ are the same or different and are selected from hydrogen, a halogen, a C1 to C10 alkyl group, a haloalkyl group, and a combination thereof.

Specific examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In order to improve cycle-life of the battery, the electrolyte may further include an ethylene-based carbonate-based compound other than vinylene carbonate or fluoroethylene carbonate as a cycle-life improving additive in order to improve battery cycle-life.

Examples of the ethylene-based carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt is dissolved in a non-aqueous organic solvent, supplies a battery with lithium ions, basically operates the lithium secondary battery, and improves transportation of the lithium ions between positive and negative electrodes. Examples of the lithium salt include one or more selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example an integer of 1 to 20, LiCl, LiCl, LiI, and $LiB(C_2O_4)_2$ (lithium bis (oxalato) borate: LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Another embodiment of the present invention provides a lithium secondary battery including a positive electrode including a positive active material; a negative electrode including a negative active material; and the aforementioned electrolyte.

The positive electrode may include a current collector and a positive active material layer including a positive active material which is formed on the current collector.

The positive active material may include lithiated intercalation compounds that reversibly intercalate and deintercalate lithium ions.

Specifically, a composite oxide of a nickel-containing metal and lithium may be used.

Specific examples thereof may be a compound represented by one of chemical formulas.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D$, (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_{b-}Co_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $Li_aFePO_4$ (0.90≤a≤1.8)

In chemical formulas, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The positive active material may include the positive active material with the coating layer, or a compound of the positive active material and the positive active material coated with the coating layer. The coating layer may include a coating element compound of an oxide or hydroxide of a coating element, oxyhydroxide of a coating element, oxycarbonate of a coating element, or hydroxycarbonate of a coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any conventional processes as long as it does not cause any side effects on the properties of the positive active material (e.g., spray coating, dipping), which is a content that can be well understood by those engaged in the relevant field and thus a detailed description will be omitted.

The positive electrode active material is not particularly limited, but a high voltage positive electrode active material capable of exhibiting a capacity even at 4.45 V or higher relative to Li/Li+ is desirable, and for example, it may be one or more types of lithium composite oxides represented by Chemical Formula 4.

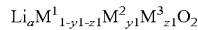 [Chemical Formula 4]

$$Li_aM^1_{1-y1-z1}M^2_{y1}M^3_{z1}O_2$$

In Chemical Formula 4, 0.9≤a≤1.8, 0≤y1≤1, 0≤z1≤1, 0≤y1+z1<1, and $M^1$, $M^2$ and $M^3$ are each independently selected from a metal such as Ni, Co, Mn, Al, Sr, Mg, or La, and a combination thereof.

For example, $M^1$ may be Ni, and $M^2$ and $M^3$ may each independently be a metal such as Co, Mn, Al, Sr, Mg, or La.

More specifically, $M^1$ may be Ni, $M^2$ may be Co, and $M^3$ may be Mn or Al, but are not limited thereto.

Specific examples of the positive active material according to the embodiment of the present invention include $Li_xNi_yCo_zAl_{1-y-z}O_2$ ($1 \le x \le 1.2$, $0.5 \le y \le 1$, and $0 \le z \le 0.5$).

The content of the positive active material may be 90 wt % to 98 wt % based on the total weight of the positive active material layer.

In an embodiment, the positive active material layer may include a binder and a conductive material. Herein, each amount of the binder and conductive material may be 1 wt % to 5 wt % based on the total weight of the positive active material layer.

The binder improves binding properties of positive active material particles with one another and with a current collector examples thereof and may for example include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material is included to improve electrode conductivity and any electrically conductive material may be used as a conductive material unless it causes a chemical change and examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be Al, but is not limited thereto.

The negative electrode includes a current collector and a negative active material layer formed on the current collector.

The negative active material may be a material that reversibly intercalates/deintercalates lithium ions, a lithium metal, a lithium metal alloy, a material capable of doping and dedoping lithium, or a transition metal oxide.

The material that reversibly intercalates/deintercalates lithium ions includes carbon materials and the carbon material may be any generally-used carbon-based negative active material in a lithium ion secondary battery and examples of the carbon material include crystalline carbon, amorphous carbon, and a combination thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, calcined coke, and the like.

The lithium metal alloy may include lithium and a metal selected from Na, K, Rb, Cs, Fr, Be, Mg, Ca, Sr, Si, Sb, Pb, In, Zn, Ba, Ra, Ge, Al, and Sn.

The material capable of doping and dedoping lithium may include Si, $SiO_x$ ($0<x<2$), a Si-Q alloy (wherein Q is selected from an alkali metal, an alkaline-earth metal, a Group 13 element, a Group 14 element, a Group 15 element, a Group 16 element, a transition metal, a rare earth element, and a combination thereof, and not Si), Sn, $SnO_2$, a Sn—R alloy (wherein R is an alkali metal, an alkaline-earth metal, a Group 13 element, a Group 14 element, a Group 15 element, a Group 16 element, a transition element, a rare earth element, or a combination thereof, and not Sn), and the like and at least one of them may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and combination thereof.

The transition metal oxide may be a vanadium oxide, a lithium vanadium oxide, and the like.

In the negative active material layer, the negative active material may be included in an amount of 95 wt % to 99 wt % based on the total weight of the negative active material layer.

In an embodiment, the negative active material layer may include a binder, and optionally a conductive material. In the negative active material layer, the amount of the binder may be 1 wt % to 5 wt % based on the total weight of the negative active material layer. When it further includes the conductive material, it may include 90 wt % to 98 wt % of the negative active material, 1 wt % to 5 wt % of the binder, and 1 wt % to 5 wt % of the conductive material.

The binder improves binding properties of negative active material particles with one another and with a current collector. The binder may be a non-water-soluble binder, a water-soluble binder, or a combination thereof.

The non-water-soluble binder may be polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, an ethylenepropylene copolymer, polyethyleneoxide, polyvinylpyrrolidone, polyepichlorohydrine, polyphosphazene, polyacrylonitrile, polystyrene, ethylenepropylenedienecopolymer, polyvinylpyridine, chlorosulfonatedpolyethylene, latex, a polyester resin, an acrylic resin, a phenolic resin, an epoxy resin, polyvinyl alcohol, and a combination thereof.

When the water-soluble binder is used as the negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount of 0.1 to 3 parts by weight based on 100 parts by weight of the negative active material.

The conductive material is included to provide electrode conductivity and any electrically conductive material may be used as a conductive material unless it causes a chemical change. Examples thereof may be a carbon-based material such as natural graphite, artificial graphite, carbon black, acetylene black, ketjen black, carbon fiber and the like; a metal-based material such as a metal powder or a metal fiber and the like of copper, nickel, aluminum, silver, and the like; a conductive polymer such as a polyphenylene derivative and the like, or a mixture thereof.

The current collector may be selected from a copper foil, a nickel foil, a stainless steel foil, a titanium foil, a nickel foam, a copper foam, a polymer substrate coated with a conductive metal, and a combination thereof.

A separator may be present between the positive electrode and the negative electrode depending on a type of the lithium secondary battery. Such a separator may include polyethylene, polypropylene, polyvinylidene fluoride, or a multilayer film of two or more layers thereof such as a polyethylene/polypropylene double-layered separator, a polyethylene/polypropylene/polyethylene triple-layered separator, and a polypropylene/polyethylene/polypropylene triple-layered separator.

When a lithium secondary battery according to an embodiment of the present invention is used in a battery using up to 4.45 V or more based on the positive electrode, the oxidative decomposition-preventing effect and high temperature cycle-life characteristics of the electrolyte may be much effectively exhibited.

A charge voltage is, for example, desirably in the range of 4.4 V to 4.6 V based on the positive electrode and more desirably in the range of 4.45 V to 4.55 V.

FIG. 1 is an exploded perspective view showing the lithium secondary battery according to an embodiment of the present invention. The lithium secondary battery according to an embodiment is illustrated as a pouch-type battery, but the present invention is not limited thereto but may be applied to various types of batteries such as cylindrical and prismatic batteries and the like.

Referring to FIG. 1, the lithium secondary pouch battery 100 according to an embodiment may include an electrode assembly 110 obtained by disposing a separator 30 between a positive electrode 10 and a negative electrode 20 and then, winding them, a case 120 in which the electrode assembly 110 is housed, and an electrode tab 130 serving as an electrical path for inducing a current formed in the electrode assembly 110 to the outside. Two surfaces of the case 120, which face each other, are overlapped and sealed. In addition, the electrolyte is injected into the case 120 containing the electrode assembly 110, so that the positive electrode 10, the negative electrode 20, and the separator 30 may be impregnated with the electrolyte (not shown).

Mode for Invention

Hereinafter, examples of the present invention and comparative examples are described. These examples, however, are not in any sense to be interpreted as limiting the scope of the invention.

Manufacture of Lithium Secondary Battery Cells

Example 1

$LiNi_{0.88}Co_{0.105}Al_{0.015}O_2$ as a positive active material, polyvinylidene fluoride as a binder, and carbon black as a conductive material were mixed respectively in a weight ratio of 97:1.6:1.4 and then, dispersed in N-methyl pyrrolidone to prepare positive active material slurry.

The positive active material slurry was coated on a 20 μm-thick Al foil, dried at 100° C., and pressed to manufacture a positive electrode.

A negative active material was prepared by mixing graphite, a styrene-butadiene rubber binder, and carboxylmethyl cellulose in a weight ratio of 98:1:1 and then, dispersed in distilled water, preparing negative active material slurry.

The negative active material slurry was coated on a 10 μm-thick Cu foil, dried at 100° C., and pressed to manufacture a negative electrode.

The manufactured positive and negative electrodes, a 25 μm-thick polyethylene separator, and an electrolyte were used to manufacture a lithium secondary battery cell.

A composition of the electrolyte is as follows.

(Composition of the Electrolyte)

Salt: $LiPF_6$ 1.3 M

Solvent: ethylene carbonate:propylene carbonate:ethyl propionate:propyl propionate (EC:PC:EP:PP=15:15:25:45 in a volume ratio)

Additive: mixture of 1 wt % of TPFPB, 1 wt % of TTFP, and 7 wt % of FEC (Herein, the composition of the electrolyte, "wt %" is based on the total amount (lithium salt+non-aqueous organic solvent+additive) of the electrolyte)

Example 2

A lithium secondary battery cell was manufactured in the same manner as Example 1 except that the electrolyte was prepared by changing the amounts of TTFP to 1.5 wt %.

Example 3

A lithium secondary battery cell was manufactured in the same manner as Example 1 except that the electrolyte was prepared by changing the amounts of TTFP to 2.0 wt %.

Comparative Example 1

A lithium secondary battery cell was manufactured in the same manner as in Example 1, except that the electrolyte was prepared without using the TPFPB and the TTFP.

Comparative Example 2

A lithium secondary battery cell was manufactured in the same manner as in Example 1, except that the electrolyte was prepared without using the TTFP.

Comparative Example 3

A lithium secondary battery cell was manufactured in the same manner as in Example 1, except that the electrolyte was prepared without using the TPFPB.

Comparative Example 4

A lithium secondary battery cell was manufactured in the same manner as in Example 1, except that an electrolyte was prepared using the TTFP in an amount of 0.5 wt %.

Comparative Example 5

A lithium secondary battery cell was manufactured in the same manner as in Example 1, except that 1 wt % of diallyl carbonate (DAC) was used instead of 1 wt % of TTFP to prepare an electrolyte.

Comparative Example 6

A lithium secondary battery cell was manufactured in the same manner as in Example 1, except that the electrolyte was prepared using 1 wt % of methoxy trimethyl silane (MOTS) instead of 1 wt % of the TTFP.

Comparative Example 7

A lithium secondary battery cell was manufactured in the same manner as in Example 1, except that the electrolyte was prepared by using 1 wt % of maleic anhydride (MA) instead of 1 wt % of TTFP.

Evaluation 1: Evaluation of Electrolyte Stability

Immersion Test of Lithium Foil

Each electrolyte according to Examples 1 to 3 and Comparative Examples 1 to 7 was taken by 5 mL, and a 200 μm-thick metal lithium foil cut to 5 mm×5 mm was immersed therein and stored at 45° C. for 5 days to examine whether or not the electrolytes were discolored or not, and the results are shown in Tables 1 to 3.

Measurement of HF Concentration

The lithium secondary battery cells according to Example 1 and Comparative Examples 1 to 3 were allowed to stand at 45° C. in a state of charge (SOC=100%) for 5 days, and HF concentrations thereof when allowed to stand at a high temperature (45° C.) were measured and then, provided in Table 1.

The HF concentrations were measured by adding water to each electrolyte to adjust a concentration of the electrolyte to 10%, performing titration by using a 0.1 M KOH aqueous solution, and then, using MV=M'V' derived from molar concentration (M)×Q volume (V)=moles (mol) to measure the number of moles of HF that is acid in the electrolyte.

Evaluation 2: Evaluation of High-Temperature Cycle-Life Characteristics

Figure 2:
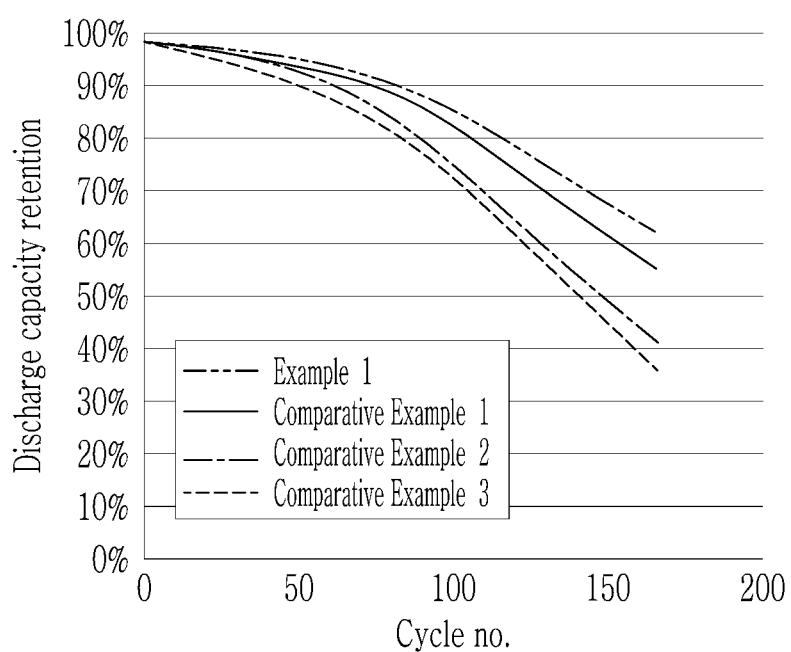
FIG. 2 is a graph showing cycle-life characteristics of lithium secondary battery cells according to Example 1 and Comparative Examples 1 to 3 at a high temperature (45° C.).
Figure 3:
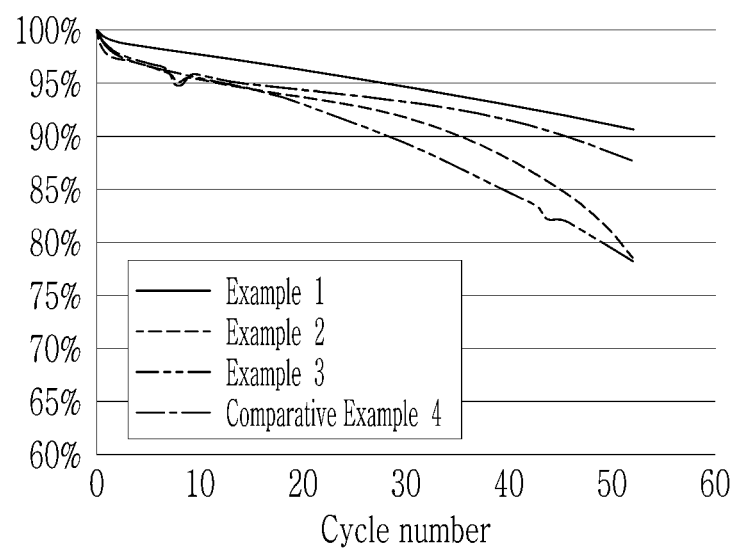
FIG. 3 is a graph showing cycle-life characteristics of lithium secondary battery cells according to Examples 1 to 3, and Comparative Example 4.
Figure 4:
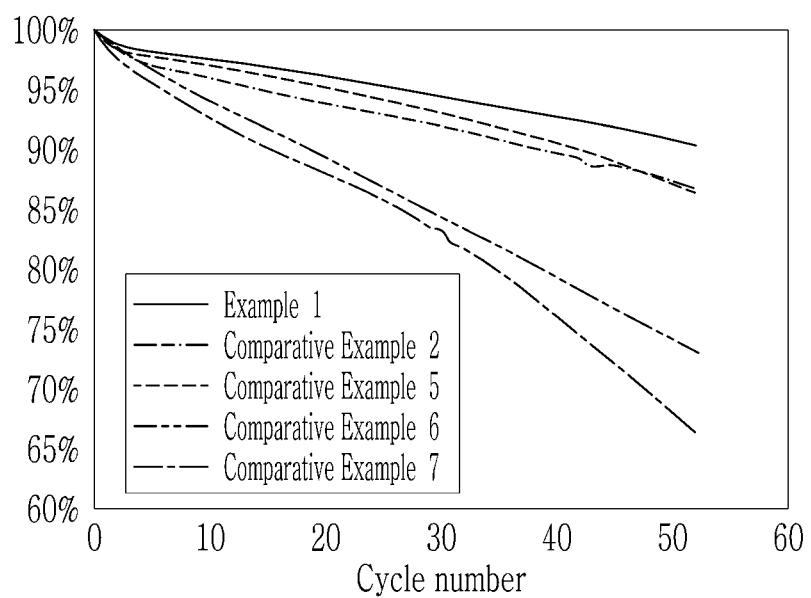
FIG. 4 is a graph showing cycle-life characteristics of lithium secondary battery cells according to Example 1, Comparative Example 2, and Comparative Examples 5 to 7.

The lithium secondary battery cells according to Examples 1 to 3 and Comparative Examples 1 to 7 were evaluated with respect to high temperature cycle-life characteristics in the following method, and the results are shown in FIGS. 2 to 4.

The battery cells were three times repetitively charged to an upper limit voltage of 4.45 V at a constant current of 0.2 C (32 mA/g) and discharged to a cut-off voltage of 3.0 V at room temperature (25° C.) to proceed formation and then, evaluated with respect to high temperature cycle-life.

Under a high temperature (45° C.) environment, the cells were repetitively charged up to an upper limit voltage of 4.45 V at a constant current of 0.5 C (80 mA/g) and discharged to a cut-off voltage of 3.0 V and then, evaluated with respect to high temperature cycle-life.

FIG. 2 is a graph showing cycle-life characteristics of lithium secondary battery cells according to Example 1 and Comparative Examples 1 to 3 at a high temperature (45° C.).

FIG. 3 is a graph showing cycle-life characteristics of lithium secondary battery cells according to Examples 1 to 3, and Comparative Example 4.

FIG. 4 is a graph showing cycle-life characteristics of lithium secondary battery cells according to Example 1, Comparative Example 2, and Comparative Examples 5 to 7.

TABLE 1

|  | Comparative Example 1 | Comparative Example 2 | Comparative Example 3 | Example 1 |
|---|---|---|---|---|
| Discolored or not | X | ○ | X | X |
| HF (ppm) | 6977 | 7035 | 5931 | 6063 |
| 45° C. cycle-life (%) (@150 cycle) | 61 | 50 | 45 | 69 |

Referring to Table 1 and FIG. 2, as in an embodiment of the present invention, when TTFP, a compound represented by Chemical Formula 2 was used in an electrolyte including a compound represented by Chemical Formula 1, TPFPB and a cyclic carbonate-based compound substituted with a halogen, FEC, the electrolyte was not only discolored, but also high temperature cycle-life characteristics were improved.

On the contrary, the electrolyte including the compound represented by Chemical Formula 1, TPFPB and the cyclic carbonate-based compound substituted with the halogen, FEC without the compound represented by Chemical Formula 2, TTFP was discolored, A lithium secondary battery cell using an electrolyte, in which at least one of the compound represented by Chemical Formula 2, TTFP and the compound represented by Chemical Formula 1, TPFPB was not included, exhibited deteriorated high temperature cycle-life characteristics.

TABLE 2

|  | Example 1 | Example 2 | Example 3 | Comparative Example 4 |
|---|---|---|---|---|
| Discolored or not | X | X | X | ○ |
| 45° C. cycle-life (%) (@50 cycles) | 91 | 81 | 80 | 88 |

Referring to Table 2 and FIG. 3, as in an embodiment of the present invention, an electrolyte including greater than 50 parts by weight and less than or equal to 200 parts by weight of the compound represented by Chemical Formula 2 based on 100 parts by weight of the compound represented by Chemical Formula 1 was not only discolored but also exhibited improved high temperature cycle-life characteristics.

On the contrary, when an electrolyte including 50 parts by weight of the compound represented by Chemical Formula 2 based on 100 parts by weight of the compound represented by Chemical Formula 1 was used, the electrolyte was discolored.

Accordingly, the effect of preventing the discoloration of the electrolyte was obtained, when the compound represented by Chemical Formula 2 was included in a specific ratio based on 100 parts by weight of the compound represented by Chemical Formula 1.

TABLE 3

|  | Example 1 | Comparative Example 2 | Comparative Example 5 | Comparative Example 6 | Comparative Example 7 |
|---|---|---|---|---|---|
| Discolored or not | X | ○ | ○ | ○ | ○ |
| 45° C. cycle-life (%) (@50 cycles) | 91 | 88 | 87 | 74 | 68 |

Referring to Table 3 and FIG. 4, as in an embodiment of the present invention, when an electrolyte including the compound represented by Chemical Formula 1, TPFPB and the compound represented by Chemical Formula 2, TTFP is used, the electrolyte was not only be discolored, but also high temperature cycle-life characteristics were improved.

On the contrary, when the compound represented by Chemical Formula 2, TTFP was not used, or other additives were used instead of the compound represented by Chemical Formula 2, the corresponding electrolyte was discolored.

Accordingly, the effect of preventing the discoloration of the electrolyte turned out to occur, when the compound represented by Chemical Formula 1 was combined with the compound represented by Chemical Formula 2.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

The invention claimed is:

1. An electrolyte for a secondary lithium battery, the electrolyte comprising:
    a non-aqueous organic solvent,
    a lithium salt, and
    an additive,
    wherein:
    the additive includes:
        a compound represented by Chemical Formula 1,
        a compound represented by Chemical Formula 2, and
        a cyclic carbonate-based compound substituted with a halogen:

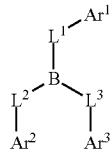

[Chemical Formula 1]

in Chemical Formula 1,
$L^1$ to $L^3$ are each independently a single bond or a substituted or unsubstituted C1 to C5 alkylene group, and
$Ar^1$ to $Ar^3$ are each independently a C6 to C20 aryl group substituted with a halogen:

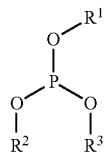

[Chemical Formula 2]

in Chemical Formula 2, $R^1$ to $R^3$ are each independently a C1 to C5 alkyl group substituted with a halogen,
the compound represented by Chemical Formula 2 is included in an amount of 0.5 wt % to less than 5 wt %, based on a total weight of the electrolyte for a lithium secondary battery, and
the compound represented by Chemical Formula 2 is included in an amount greater than 50 parts by weight and less than or equal to 200 parts by weight, based on 100 parts by weight of the compound represented by Chemical Formula 1.

2. The electrolyte for a secondary lithium battery of claim 1, wherein $Ar^1$ to $Ar^3$ in Chemical Formula 1 are each independently a C6 to C20 aryl group substituted with at least two fluoro (—F) groups.

3. The electrolyte for a secondary lithium battery of claim 1, wherein the compound represented by Chemical Formula 1 is tris(pentafluorophenyl)borane (TPFPB).

4. The electrolyte for a secondary lithium battery of claim 1, wherein $R^1$ to $R^3$ in Chemical Formula 2 are each independently a C1 to C5 alkyl group substituted with at least two fluoro (—F) groups.

5. The electrolyte for a secondary lithium battery of claim 1, wherein the compound represented by Chemical Formula 2 is tris(2,2,2-trifluoroethyl)phosphite (TTFP).

6. The electrolyte for a secondary lithium battery of claim 1, wherein the cyclic carbonate-based compound substituted with the halogen is fluoroalkylene carbonate.

7. The electrolyte for a secondary lithium battery of claim 1, wherein the cyclic carbonate-based compound substituted with the halogen is fluoroethylene carbonate.

8. The electrolyte for a secondary lithium battery of claim 1, wherein:
    the compound represented by Chemical Formula 1 is included in an amount of 0.5 wt % to 10 wt %, and
    the cyclic carbonate-based compound substituted with the halogen is included in an amount of 5 wt % to 20 wt %,
    all wt % being based on a total weight of the electrolyte for a lithium secondary battery.

9. The electrolyte for a secondary lithium battery of claim 1, wherein the additive includes a mixture of trispentafluorophenyl borane (TPFPB), tris(2,2,2-trifluoroethyl) phosphite (TTFP), and fluoroethyl carbonate (FEC).

10. The electrolyte for a secondary lithium battery of claim 1, wherein the additive further includes another additive, the other additive including vinylene carbonate (VC), vinylethylene carbonate (VEC), succinonitrile (SN), polysulfone, 1,3,6-hexane tricyanide (HTCN), propenesultone (PST), propanesultone (PS), lithiumtetrafluoroborate ($LiBF_4$), lithium difluorophosphate ($LiPO_2F_2$), or 2-fluorobiphenyl (2-FBP).

11. The electrolyte for a secondary lithium battery of claim 10, wherein the other additive is included in an amount of 5 wt % to 20 wt %, based on a total weight of the electrolyte for a lithium secondary battery.

12. The electrolyte for a secondary lithium battery of claim 1, wherein the non-aqueous organic solvent includes a cyclic carbonate and a chain carbonate in a volume ratio of 1:9 to 1:5.

13. A secondary lithium battery, comprising
    a positive electrode including a positive active material;
    a negative electrode including a negative active material; and
    the electrolyte of claim 1.

14. The secondary lithium battery of claim 13, wherein:
    the positive active material includes a lithium composite oxide represented by Chemical Formula 4:

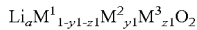  [Chemical Formula 4]

in Chemical Formula 4,
$0.9 \le a \le 1.8$, $0 \le y1 \le 1$, $0 \le z1 \le 1$, $0 \le y1+z1 < 1$, and
$M^1$, $M^2$, and $M^3$ are each independently Ni, Co, Mn, Al, Sr, Mg, or La, or a combination thereof.

15. The secondary lithium battery of claim 13, wherein the lithium secondary battery is usable at a high voltage of greater than or equal to 4.45 V based on the positive electrode.

* * * * *